June 10, 1930.  J. W. MORRIS  1,763,475
GAME INDICATOR FOR CARD TABLES
Filed Aug. 27, 1929
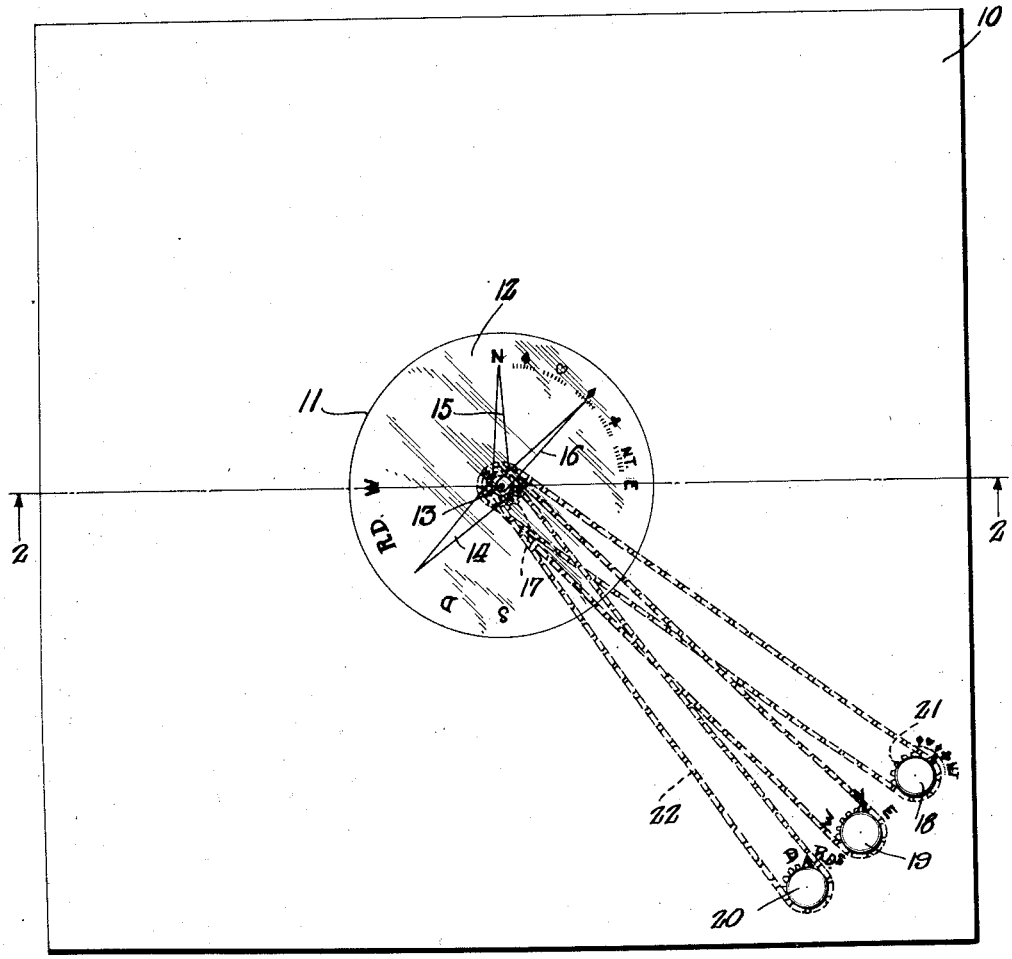
Fig.1.
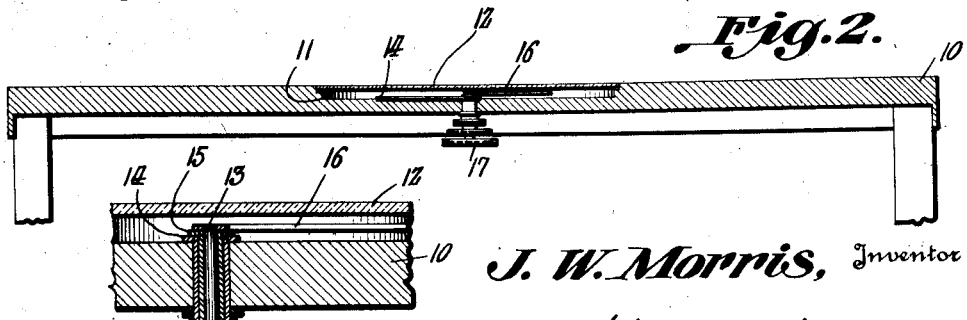
Fig.2.
Fig.3.
J. W. Morris, Inventor
By Watson E. Coleman.
Attorney Patented June 10, 1930

1,763,475

UNITED STATES PATENT OFFICE

JOSEPH W. MORRIS, OF TONKAWA, OKLAHOMA

GAME INDICATOR FOR CARD TABLES

Application filed August 27, 1929. Serial No. 388,805.

This invention relates to card tables, and particularly to tables for use in playing bridge, either auction bridge or contract bridge.

The general object of the present invention is to provide means, operated by one of the players who scores the game, which will indicate the position of the deal, indicate the trump and the amount bid, and indicate whether the bid has been doubled or redoubled.

A further object is to provide a device of this character which includes pointers disposed within a recessed and glazed opening in the center of the table, where it is observable by all of the players, and provide means disposed adjacent one of the players whereby these separate and independent pointers can be controlled.

Other objects will appear in the course of the following description.

My invention is illustrated in the accompanying drawings, wherein:—

Figure 1 is a top plan view of a card table constructed in accordance with my invention;

Figure 2 is a section on the line 2—2 of Figure 1;

Figure 3 is an enlarged fragmentary section on the same line but taken through the rotatable indicators.

Referring to the drawings, 10 designates a table top such as is used in playing bridge or other card games. This table top has a recess 11 preferably disposed in the center of the table and which is covered with a plate of glass 12 or other suitable material, this plate being flush with the top of the table. Extending upward through the center of the recess 12 is a stud 13 upon which are mounted the three pointers 14, 15 and 16. Each of these pointers 14, 15 and 16 is mounted upon a separate sleeve, the sleeves being concentric to each other and to the stud 13, and each sleeve carries upon it a sprocket wheel 17. Inasmuch as there are three of these pointers, there are three sprocket wheels. Adjacent one corner of the table are three knobs 18, 19 and 20. These knobs extend downward beneath the table, and each knob carries upon it a sprocket wheel 21 over which the sprocket chains 22 are trained, which sprocket chains pass around the wheels 17.

It will be noted that the hand or pointer 15 is adapted to be turned around to indicate the dealer, and to this end there is a dial which may be printed upon the table top itself or printed in the bottom of the recess 11 showing the four points of the compass, north, south, east and west, to which the pointer 15 is adapted to be shifted to indicate who is the dealer or who is to be the next dealer. It will be also noted that the sprocket wheel 17 for this particular pointer is smaller than the sprocket wheel 21 for the corresponding knob 19 so that the rotative movement of the knob 19 is multiplied and the movement of the pointer 15 is relatively rapid.

The pointer 14 is used for indicating the trump, and around the margin of the opening 11 or in the bottom of the recess there are the indicia marks for "No trumps" and the four suits, clubs, diamonds, hearts and spades. Inward of the indicating mark for each suit there are the numerals 1 to 7 indicating the number of tricks bid. The pointer 14 has a relatively large sprocket wheel 17 so that the hand or pointer moves relatively slowly and thus may be put exactly in place to indicate the number of the tricks to be taken. The pointer 16 is used for indicating whether the bid has been doubled or redoubled. To this end, the table at the margin of the opening 11, either at the bottom of this recess or exteriorly of the recess, is provided with indications such as the words "Doubled" and "Redoubled", to which the pointer can be moved. This pointer, as before noted, is shifted by the knob 20.

While it is not altogether necessary, it is preferable that indicating marks corresponding to the indicating marks for the several pointers shall be disposed concentrically to the knobs 18, 19 and 20, each knob having a pointer thereon which is shiftable to the indicating marks. Thus for the knob 19 there will be four indications for south, west, east and north, for the knob 18 there will be indications for the several trumps and the number of tricks bid, while for the knob 20 there will be two indications, one for "doubled" and the other for "redoubled". As before remarked, this is not absolutely necessary but is preferable.

I do not wish to be limited to the exact means whereby the pointer is shifted, but it is preferable to use the sprocket chains 22 and the sprocket wheels over which the chains are trained. Such a construction is very simple, direct and will not be likely to get out of order. I have found this means for indicating the dealer, the trump, the amount bid, and whether the bid has been doubled or redoubled particularly convenient, as oftentimes there arises a question as to what the bid is and whether the bid has been doubled or redoubled, and oftentimes there is confusion with regard to who is the dealer. The person who scores the game is preferably the player who will attend to the shifting of these pointers, though obviously this is not absolutely necessary.

I do not wish to be limited to any particular style of the table or any particular style for the pointers or the indicating marks surrounding the recess, as these might be varied in many ways without departing from the spirit of the invention as defined in the appended claims.

I claim:—

1. A card table having therein a circular recess, a glass cover for the recess flush with the table top, the margin of the recess having thereon indicating marks, one series of marks indicating north, south, east and west points on the table and thereby indicating the dealer and another series of marks indicating the number of any trump which is bid, and indicating marks indicating when the bid is doubled or redoubled, a plurality of pointers rotatably mounted within the recess, one of said pointers being adapted to be turned to indicate the dealer, another pointer being adapted to be turned to indicate the bid made and the number of tricks contracted to be made and the third pointer being shiftable to the indications for doubling or redoubling, and manually operable means remote from the recess and mounted upon the table whereby said pointers may be independently shifted.

2. A card table having therein a circular recess, a glass cover for the recess flush with the table top, the margin of the recess having thereon indicating marks, one series of marks indicating north, south, east and west points on the table and thereby indicating the dealer and another series of marks indicating the several bids and having in connection therewith marks indicating the number of tricks which is bid, and indicating marks indicating when the bid has been doubled or redoubled, a plurality of pointers rotatably mounted within the recess, one of said pointers being adapted to be turned to indicate the dealer, another pointer being adapted to be turned to indicate the bid made and the number of tricks contracted to be made, and the third pointer being shiftable to the indications for doubling or redoubling, a plurality of knobs mounted upon the table, there being a knob for each pointer, and operative connections between the several knobs and the several pointers whereby the pointers may be rotated independently of each other.

3. A card table having therein a circular recess, a glass cover for the recess flush with the table top, the margin of the recess having thereon indicating marks, one series of marks indicating north, south, east and west points on the table and thereby indicating the dealer and another series of marks indicating the several bids and having in connection therewith marks indicating the number of tricks which is bid, and indicating marks indicating when the bid is doubled or redoubled, a plurality of pointers rotatably mounted within the recess, one of said pointers being adapted to be turned to indicate the dealer, another pointer being adapted to be turned to indicate the bid and the number of tricks contracted to be made, and the third pointer being shiftable to the indications for doubling or redoubling, the said pointers being mounted on concentric sleeves, sprocket wheels mounted upon the sleeves, knobs mounted upon the table remote from the recess, each knob carrying a sprocket wheel, and sprocket chains disposed around the sprocket wheels of the knobs and engaging the sprocket wheels of the sleeves whereby said pointers may be independently rotated.

4. A card table having therein a circular recess, a glass cover for the recess flush with the table top, the margin of the recess having thereon indicating marks, one series of marks indicating north, south, east and west points on the table and thereby indicating the dealer and another series of marks indicating the several bids and having in connection therewith marks indicating the number of tricks which is bid, and indicating marks indicating when the bid has been doubled or redoubled, a plurality of pointers rotatably mounted within the recess, one of said pointers being adapted to be turned to indicate the dealer, another pointer being adapted to be turned to indicate the bid and the number of tricks contracted to be made, and the third pointer being shiftable to the indications for doubled or redoubled, the said pointers having concentric sleeves, sprocket wheels mounted upon the sleeves, knobs mounted upon the table remote from the recess, each knob carrying a sprocket wheel, and sprocket chains disposed around the sprocket wheels of the knobs and engaging the sprocket wheels of the sleeves whereby said pointers may be independently rotated, each knob having associated therewith indicating marks corresponding to the appropriate indicating marks for the connected pointer to which an indicator on the knob may be turned.

In testimony whereof I hereunto affix my signature.

JOSEPH W. MORRIS.